United States Patent [19]

Ohnishi

[11] Patent Number: 5,396,589
[45] Date of Patent: Mar. 7, 1995

[54] CHARACTER INPUT APPARATUS FOR DETERMINING THE TOTAL NUMBER OF CHARACTERS WHICH MAY BE WRITTEN IN A PREDETERMINED SPACE

[75] Inventor: Yoshio Ohnishi, Machida, Japan

[73] Assignee: Matsushita Electric Industrial Co., Ltd., Osaka, Japan

[21] Appl. No.: 162,969

[22] Filed: Dec. 8, 1993

Related U.S. Application Data

[63] Continuation of Ser. No. 666,000, Mar. 6, 1991, abandoned.

[30] Foreign Application Priority Data

Mar. 9, 1990 [JP] Japan ................. 2-58296

[51] Int. Cl.$^6$ ............................................. G06F 15/62
[52] U.S. Cl. ................... 395/148; 395/145; 364/419.1; 400/705.2
[58] Field of Search ............ 395/148, 144, 145; 345/156, 192; 364/419.1, 419.07, 419.17, 710.01, 710.08, 225.6, 226.1, 943, 943.43, 943.5; 400/703, 705, 705.2, 710

[56] References Cited

U.S. PATENT DOCUMENTS

| | | | |
|---|---|---|---|
| 2,093,142 | 9/1937 | Bolongaro | 400/705.2 |
| 4,143,808 | 3/1979 | Klavitter | 235/102 |
| 4,193,071 | 3/1980 | Hasegawa | 340/723 |
| 4,484,826 | 11/1984 | Horn et al. | 400/279 |
| 4,523,294 | 6/1985 | Winn | 364/200 |
| 4,755,955 | 7/1988 | Kimura et al. | 364/518 |
| 4,802,104 | 1/1989 | Ogiso | 364/518 |
| 4,923,314 | 5/1990 | Blanchard, Jr. et al. | 400/63 |
| 5,065,358 | 11/1991 | Yamakawa | 364/419 |

FOREIGN PATENT DOCUMENTS

| | | |
|---|---|---|
| 0072709 | 2/1983 | European Pat. Off. |
| 57-199675 | 12/1982 | Japan . |
| 57-720881 | 12/1982 | Japan . |
| 58-49291 | 3/1983 | Japan . |
| 58-59881 | 4/1983 | Japan . |
| 59-7077 | 1/1984 | Japan . |
| 63-24457 | 2/1988 | Japan . |
| 63-192154 | 8/1988 | Japan . |
| 63-217464 | 9/1988 | Japan . |
| 63-219062 | 9/1988 | Japan . |
| 4144775 | 5/1992 | Japan . |
| 1220067 | 1/1971 | United Kingdom . |

*Primary Examiner*—Heather R. Herndon
*Assistant Examiner*—Joseph Feild
*Attorney, Agent, or Firm*—Stevens, Davis, Miller & Mosher

[57] ABSTRACT

A character input apparatus such as a word processor or a personal computer used to input characters and edit documents utilizes a character input device such as a keyboard which generates signals representing types of procedures or a signal representing change of type of character to be counted, and outputs character data. A key discrimination device discriminates contents of the signals input from the character input device. The character data is stored in a data memory. In response to a determination by the key discrimination device, a count area designation device designates and stores one or more character count areas in which characters are counted. A character discrimination device stores a designated type of character to be counted and determines whether character data read from the data memory is to be counted. A character count device counts character data, total character data capacity for each count area, and remaining character data capacity for each count area. A character count output device displays on a display device the numbers calculated by the character count device.

2 Claims, 2 Drawing Sheets

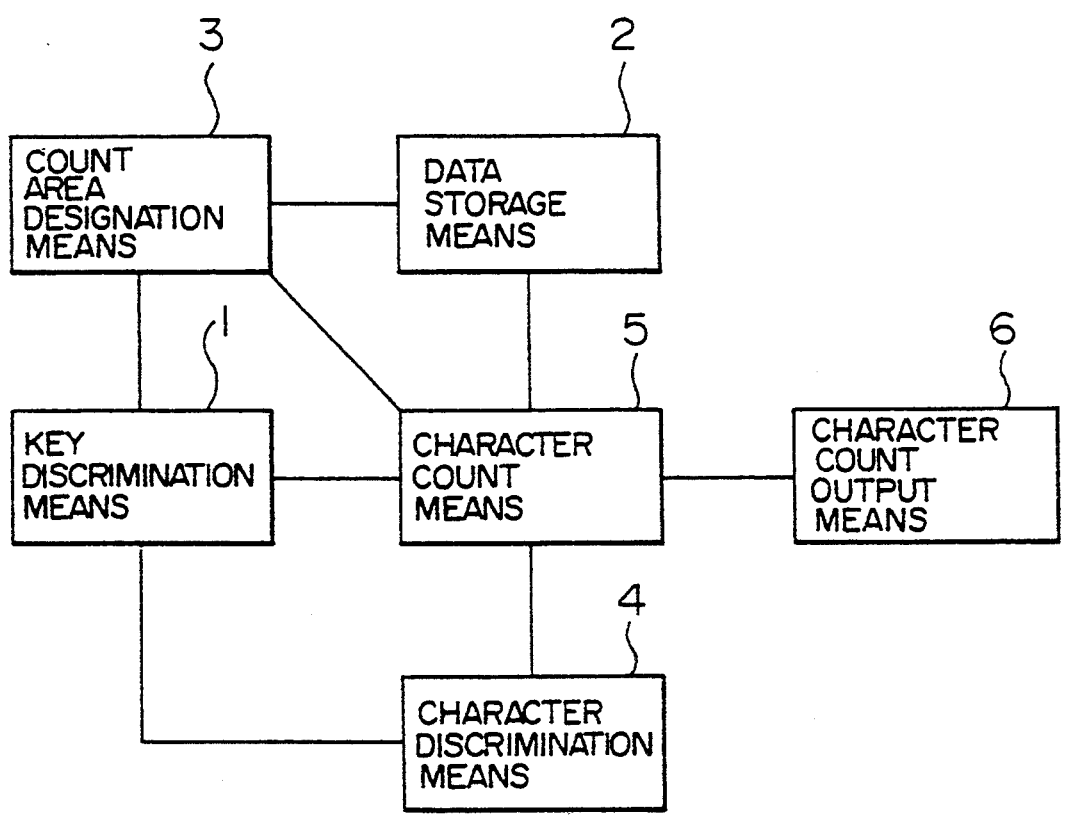
F I G. 1

CHARACTER INPUT APPARATUS FOR DETERMINING THE TOTAL NUMBER OF CHARACTERS WHICH MAY BE WRITTEN IN A PREDETERMINED SPACE

This application is a continuation of application Ser. No. 07/666,000, filed Mar. 6, 1991, (abandoned).

BACKGROUND OF THE INVENTION

The present invention relates to a character input apparatus for inputting characters into an information processing apparatus such as a word processor or a computer which inputs characters and edits documents.

In a conventional character input apparatus, when a document is to be prepared, an operator sets a format which defines the number of lines and the number of digits to be accommodated on a sheet, and a form which conforms to the format is displayed on a screen. In order for the operator to count the number of characters he/she inputted during the document preparation operation, he/she must calculate it based on the number of lines and the number of digits of the displayed document.

In the conventional art, since the operator must calculate the exact number of characters based on the number of lines and the number of digits, where the document incorporates a layout which uses a multi-stage edition such as that used in a desk-top printing (DTP) or the document extends over many pages, it is troublesome to calculate the number of characters when a text is to be contained only in a specified portion of the document, and smooth character input operation is disturbed by the work to calculate the number of characters.

SUMMARY OF THE INVENTION

It is an object of the present invention to solve the problem encountered in the conventional art and provide a character input apparatus which automatically counts and displays the number of characters to support an efficient document input operation.

In order to achieve the above object, the character input apparatus of the present invention comprises calculation area designation means for designating and storing an area of counting characters in a document, character discrimination means for discriminating whether character data to be accommodated in the designated area is for the characters to be counted or not, character count means for counting the characters to be counted and storing the count, and character count output means for outputting the count to an output device. In this manner, the number of characters in the designated area can be automatically counted.

Accordingly, because the means for automatically counting the number of characters in the designated area is provided in the present invention, the count of the characters including 1. the number of characters permitted to input in the designated area,
2. the number of characters inputted so far, and
3. the remaining number of characters permitted to be inputted in the designated area, can be automatically outputted.

BRIEF DESCRIPTION OF THE DRAWINGS

One embodiment of the present invention is now explained with reference to the accompanying drawings in which:

FIG. 1 shows a block diagram of a character input apparatus of the present invention.

DESCRIPTION OF THE PREFERRED EMBODIMENT

Figure 2:
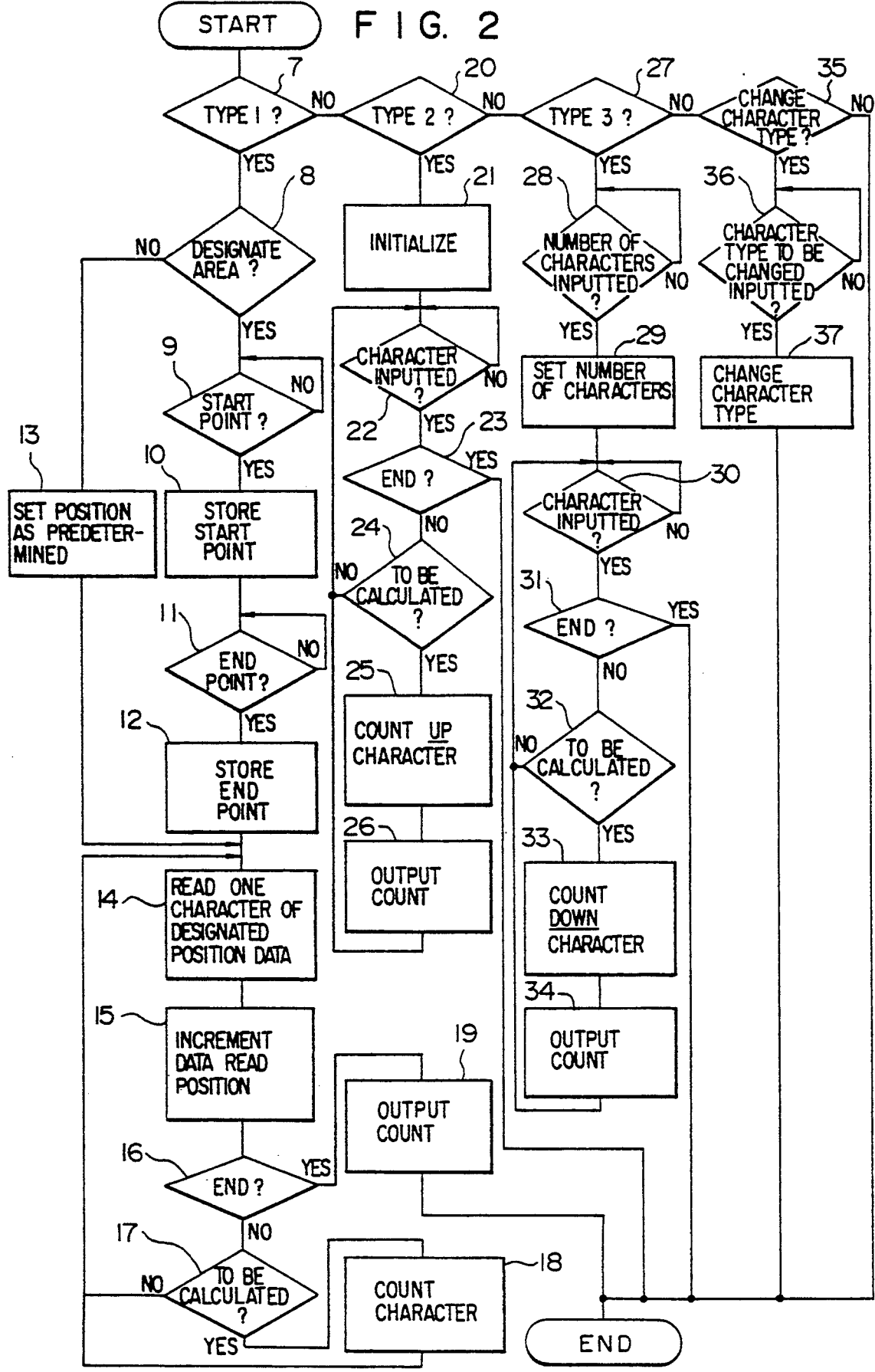
FIG. 2 shows a flow chart of an operation in the embodiment.

In FIG. 1, numeral 1 denotes key descrimination means for examining an input signal to determine which group a key which has generated the signal belongs, numeral 2 denotes data storage means for storing inputted character data, numeral 3 denotes calculation area designation means for designating an area of calculation of the number of characters, numeral 4 denotes character discrimination means for setting up types of characters to be counted and discriminating whether character data is to be counted or not to be counted, numeral 5 denotes character count means for counting the characters to be counted in the calculation area, and numeral 6 denotes character count output means for outputting the count to an output device.

The operation of the character input apparatus in accordance with the present embodiment is now explained with reference to FIG. 2. In the present embodiment, three different types of counting methods of the number of characters are used. Those will be explained separately.

When the key discrimination means 1 determines that the key which has generated the input signal relates to the type 1 calculation method, the character count means 5 cooperates with the character discrimination means 4 and the character count output means 6 to count the character data in the area designated by the calculation area designation means 3 and outputs the character data (steps 7–19). When the key discrimination means 1 determines that the key data relates to the type 2 calculation method, the character count means 5 cooperates with the character discrimination means 4 to determine the type of character for each input character data and count the characters which meet the condition so that it outputs the count of current input characters through the character count output means 6 (steps 20–26). When the key discrimination means 1 determines that the key data relates to the type 3 calculation method, the character count means 5 cooperates with the character discrimination means 4 and the character count output means 6 to calculate the number of characters permitted to be further inputted each time the character data is inputted and output the count (steps 27–34).

Type 1 calculation

When the key descrimination means 1 determines the designation of the type 1 calculation method (Y branch in step 7), the calculation area designation means 3 requests the selection of processing method as to whether an area of calculation is to be designated or not. If the area designation method is selected (Y branch in step 8), the calculation area designation means 3 monitors the input of a start point and an end point of the area of calculation, and when they are designated, it determines whether the designated start point can be a start point of the area or not, and if it can be the start point (Y branch in step 9), it stores the designated start point as a start point correlated to the character data position in the data storage means 2 (step 10). Similarly, it determines whether the designated end point can be an end point or not, and if it can be the end point (Y branch in step 11), it stores the end point (step 12). If non-designation of an area is selected in the step 8 (N branch in step 8), the area of calculation is automatically set to a predetermined area such as all characters in the entire document or a whole page.

The character count means 5 then reads one character data, stored in the data storage means 2 based on the designated area position information stored in the calculation area designation means 3 (step 14), and increments the position information in preparation for reading the next character data (step 15). Whether the data thus read is the character to be counted (i.e., which corresponds to the character information for designating the character to be counted stored in the character designation means 4) is determined, and if it is the character to be counted (Y branch in step 17), the character is counted and the count is stored (Y branch is step 18). The above process is repeated and when the characters in the designated area have been counted (Y branch in step 16), the character count output means 6 outputs the character count stored in the character count means 5 to the output device (step 19). Then, the process is terminated.

Type 2 calculation

When the key discrimination means 1 determines the designation of the type 2 calculation method (Y branch in step 20), the character count means 5 initializes the character count information stored therein (step 21) and monitors the character data input (N branch in step 22). When a character is inputted (Y branch in step 22), whether the input character data is a character to be counted or not is determined based on the character information stored in the character discrimination means 4. If it is the character to be counted (Y in step 24), the character is counted up, and the count indicating the number of characters so far inputted is stored (step 25). The character count output means 6 outputs the count stored in the character count means 5 to the output device (step 26). The above step is repeated until an instruction of end of process is issued (Y in step 23).

Type 3 calculation

When the key designation means 1 determines the designation of the type 3 calculation method (Y in step 27), the character count means 5 monitors the input of input character count which indicates the number of characters to be inputted (N in step 28). If the count is inputted (Y in step 28), the input character count is stored (step 29) and the input of characters is monitored (N in step 30). When the character data is inputted (Y in step 30), whether the input character data is the character to be counted is determined based on the character information stored in the character discrimination means 4. If it is the character to be counted (Y in step 32), the number of input characters is counted down from the stored input character count to calculate the number of characters permitted to be further inputted and it is stored (step 33). The character count output means 6 outputs the count stored in the character count means 5 to the output device (step 34). The above process is repeated until the instruction of end of process is issued (Y branch in step 31).

If the key discrimination means 1 determines the designation of a change of character to be counted (Y branch in step 35), the character discrimination means 4 monitors the input which designates the type of character to be newly counted (N branch in step 36), and if the input is applied (Y branch in step 36), addition, deletion or change process is performed to the stored characters to be counted (step 37), and the result is stored. Thereafter, the characters are counted based on the updated stored data.

As seen from the above embodiment, the character input apparatus of the present invention comprises means for storing the designated area, means for discriminating the characters to be counted, means for counting the characters and means for outputting the count. Thus, the number of characters inputted so far and the number of characters permitted to be further inputted are automatically outputted and an efficient document input operation can be supported.

Further, the type of character data to be counted may be added or changed as desired. Thus, where punctuation is designated to be counted, the prepared document may be evaluated based on an index which indicates the number of punctuations in the document.

We claim:

1. A character input apparatus comprising:

display means;

input means for inputting input data, said input data including character data representative of characters and command data for defining at least one count area of a document, said said at least one count area being a portion of said document in which characters are to be counted;

key discrimination means, receiving said input data from said input means, for discriminating contents of said input data;

data storage means, controlled by said key discrimination means, for storing said character data inputted by said input means;

count area designation means, controlled by said key discrimination means, for defining and storing said at least one count area of said document in accordance with said command data;

character discrimination means for storing predetermined character data and determining whether said character data stored in said data storage means are to be counted in accordance with said predetermined character data;

character count means for calculating (i) a first total number representing a total character capacity of said at least one count area, (ii) a second number representing a quantity of characters, determined to be counted by said character discrimination means, already stored in said data storage means, and (iii) a third number representing a quantity of characters that it is possible to add further to said at least one count area, said character count means cooperating with (i) said data storage means, (ii) said count area designation means and (iii) said character discrimination means; and character count output means for displaying at least one of said first, second and third numbers on said a display means, wherein said at least one of said first, second and third numbers displayed on said display means enables a user to control layout of said document.

2. A method of operating a character input apparatus comprising:

(a) inputting input data to said apparatus, said input data including character data representative of characters and command data for defining at least one count area of a document, said at least one count area being a portion of said document in which characters are to be counted;

(b) discriminating contents of said input data to determine whether said data is character data or command data;

(c) defining said at least one count area of a document by defining an initial position and an ending position in accordance with said command data or previously stored data;

(d) determining whether said character data is to be counted in accordance with predetermined character data;

(e) calculating (i) a first total number representing a total character capacity of said at least one count area, (ii) a second number representing a quantity of characters, determined to be counted in step (d), already entered, and (iii) a third number representing a quantity of characters that it is possible to add further to said at least one count area; and (f) displaying at least one of said first, second and third numbers on a display, wherein said at least one of said first, second and third numbers displayed on said display enables a user to control layout of said document.

* * * * *